United States Patent
Krulik

(10) Patent No.: US 6,652,758 B2
(45) Date of Patent: Nov. 25, 2003

(54) SIMULTANEOUS AMMONIA AND FLUORIDE TREATMENT FOR WASTEWATER

(75) Inventor: Gerald A. Krulik, San Clemente, CA (US)

(73) Assignee: Ionics, Incorporated, Watertown, MA (US)

(*) Notice: Subject to any disclaimer, the term of this patent is extended or adjusted under 35 U.S.C. 154(b) by 25 days.

(21) Appl. No.: 09/960,640

(22) Filed: Sep. 21, 2001

(65) Prior Publication Data
US 2002/0148790 A1 Oct. 17, 2002

Related U.S. Application Data
(60) Provisional application No. 60/235,992, filed on Sep. 26, 2000.

(51) Int. Cl.$^7$ ................ C02F 1/52; C02F 1/72
(52) U.S. Cl. ............ 210/721; 210/723; 210/724; 210/729; 210/756; 210/759; 210/760; 210/800; 210/915
(58) Field of Search .................. 210/721, 723, 210/724, 729, 756, 759, 760, 800, 915

(56) References Cited

U.S. PATENT DOCUMENTS

| | | |
|---|---|---|
| 3,961,027 A | 6/1976 | Crossley |
| 4,028,237 A | 6/1977 | Nishimura et al. |
| 4,655,929 A | 4/1987 | Tanaka et al. |
| 4,657,680 A | 4/1987 | Zibrida |
| 5,043,072 A | 8/1991 | Hitotsuyanagi et al. |
| 5,106,509 A | 4/1992 | Jansen |
| 5,871,648 A | 2/1999 | Allen et al. |
| 5,900,220 A | 5/1999 | Allen |
| 5,904,853 A | 5/1999 | Allen et al. |
| 5,910,251 A | 6/1999 | Allen et al. |
| 6,054,058 A | 4/2000 | Joko et al. |
| 6,210,589 B1 | 4/2001 | Lee et al. |
| 6,261,456 B1 | 7/2001 | Yamasaki et al. |

Primary Examiner—Betsey Morrison Hoey

(57) ABSTRACT

An improved method of treating wastewater to remove ammonia and fluoride is provided. The method comprises the steps of chemical destruction of ammonia with an oxidizing agent, followed by treatment with calcium salts to precipitate insoluble calcium fluoride, and filtration to remove the precipitate.

45 Claims, 2 Drawing Sheets

SIMULTANEOUS AMMONIA AND FLUORIDE TREATMENT FOR WASTEWATER

RELATED APPLICATIONS

This application claims priority to U.S. Provisional Patent Application, Ser. No. 60/235,992 filed Sep. 26, 2000, the entire disclosure of which is hereby incorporated by reference.

FIELD OF THE INVENTION

The present invention relates generally to a treatment for wastewater. More specifically, the present invention provides an enhanced system and more efficient process of treating industrial wastewater to remove ammonia and fluoride sequentially by a process of chemical destruction of ammonia, treatment with near stoichiometric amounts of calcium salts, and filtration.

BACKGROUND OF THE INVENTION

Buffered oxide etch processes are used in the semiconductor industry to process silica wafers. The buffered oxide etch process requires the use of high concentrations of ammonia fluoride or ammonium bifluoride which end up in the semiconductor wastewater. Fluoride must be removed from wastewater streams prior to discharge into the city water systems, and local discharge limits can be lower than 5 ppm. Discharge limits for ammonia, which can be as low as 5 ppm, also often require its removal from wastewater. Additionally, ammonia interferes with the precipitation of calcium fluoride, necessitating the use of large excess amounts of calcium salts in the treatment process.

To meet discharge limits for ammonia and/or fluoride in wastewater, various treatment processes have been developed. Air stripping is one method of reducing ammonia concentrations in wastewater. Air stripping must be done at elevated alkaline pH and, to achieve very low concentrations of ammonia, in heated solution at pH greater than 10. This is very energy intensive, requires the addition of large amounts of caustic, and should be done without solids in the wastewater. Furthermore, rather than chemically destroying the ammonia, this process merely transfers it to the gas phase from which it must be scrubbed into an acidic absorption solution or discharged to the environment. Fluoride is not amenable to air stripping, and thus must be removed in a separate step, either before or after the air stripping.

Reverse osmosis (RO) is another available wastewater treatment technology that can be applied to treat both fluoride and ammonia. However, RO's sensitive to membrane fouling by scale formation or biological growth on the filter membrane. Scale formation is avoided by either removing calcium, magnesium, and other scale forming materials prior to the filtration step or, more commonly, by acidifying the wastewater to deter precipitation of calcium and or magnesium carbonate or by adding dispersing agents to retard fouling at the RO membrane surface. Solvents, such as alcohols or ketones, and other sources of chemical or biological oxygen demand also must be removed to prevent biological growth on the membrane. The acidified RO concentrate preferentially contains both ammonia and fluoride, but as with air stripping, the ammonia is not chemically destroyed. Fluoride removal is normally done after the RO concentration step. However, the elevated ammonia concentrations in the concentrate hinders calcium fluoride precipitation necessitating use of large excesses of calcium salts.

Another treatment technique is ion exchange using cationic ion exchange resins. However, this process is not efficient for wastewater with high ammonia concentrations because the resins must be regenerated often at high chemical costs. As with the methods discussed above, ammonia is merely transferred from the wastewater to a different medium, in this case a concentrated acid waste stream. To avoid self-stripping of the ammonia, the pH and concentration of the incoming wastewater must be closely monitored and adjusted. Other cations such as calcium, magnesium, sodium, and the like will interfere with the removal of ammonia. Fluoride will interfere with effective removal of ammonia due to the formation of buffered ammonium fluoride compounds; and the ammonia will interfere with fluoride precipitation.

Biological treatment has been previously applied for destruction of ammonia in wastewater. However, such treatment is slow and relatively inefficient, requires the construction of treatment ponds with substantial capital cost and space requirements, is sensitive to temperature and ionic strength and the presence of other compounds in the wastewater, and requires organic matter and fertilizers to work well. Because only low fluoride concentrations are compatible with biological treatment, dilution of the wastewater can be required. Dilution prior to treatment wastes water and inhibits precipitation of fluoride because of limitations imposed by the solubility of calcium fluoride (about 16 ppm). Thus, the total mass of fluoride discharged from the treatment process increases with dilution since similar fluoride effluent concentrations are achieved through precipitation regardless of the starting fluoride concentration. This is the reason why it is more efficient to treat high concentrations of fluoride rather than low concentrations of fluoride.

Chemical destruction by hypochlorite has also been used to remove ammonia but with limited success. Precise pH control is necessary to avoid formation of chloramines. The presence of organic matter can lead to formation of halogenated organic compounds. Residual hypochlorite may generate toxic gases if mixed with unreacted ammonia solutions, for example, if the treated wastewater is mixed with other untreated rinse waters. Thus, an improved method for the removal of ammonia and fluoride is needed.

OBJECT AND SUMMARY OF THE INVENTION

Accordingly, it is an object of the present invention to provide an improved system and method for removing ammonia and fluoride from wastewater. In particular, the inventor has found that a significant improvement in the prior art process for removal of fluoride from wastewater can be achieved by treating the wastewater with an oxidizer to chemically destroy ammonia before adding calcium salts to precipitate calcium fluoride. It is another object of the current invention to reduce the costs of removing fluoride from wastewater by reducing the chemical requirements and generating a low volume waste stream that can be more easily disposed of.

In general, the current invention present a process by which ammonia is chemically destroyed prior to treatment of fluoride. The wastewater is then treated with near stoichiometric amounts of calcium salts to precipitate calcium fluoride. Finally, suspended solids are removed from the wastewater. The final step can be a conventional settling tank or some sort of filtration system. A preferred solids removal process is a single pass, low pressure, high flow rate filtration step, such as the EnChem system available from MicroBar. Options include neutralization of excess oxidizer and byproducts, and removal of byproducts with activated carbon. The neutralization of excess oxidizer and byproducts can be done chemically prior to filtration. Often it is more convenient to do this step after filtration, when the solids-free water can be treated with reducing agents and/or contacted with activated carbon. Activated carbon can remove hypochlorites and chloramines by chemical absorption and reaction. Activated carbon also helps to remove any chlorinated organic materials which may have formed in the wastewater.

More specifically, the present invention provides a method for treating wastewater to reduce concentrations of fluoride and ammonia. Initially, in one embodiment, the oxidation-reduction potential of the wastewater is measured using an oxidation-reduction potential measuring device. Then an oxidizer is added in sufficient quantity to increase the oxidation-reduction potential of the wastewater above that of a chloramine solution. Next a soluble calcium salt is added to the wastewater at a concentration greater than stoichiometric. The soluble calcium salt lowers the solubility of fluoride in the wastewater and promotes precipitation of solid calcium fluoride. Excess oxidizer and oxidation by-products in the wastewater are then destroyed by adding an oxidizer and oxidation by-product neutralizing reagent to the wastewater. Alternatively, this can be done after the solids separation step. Finally the wastewater is passed through a solids separation system to separate the wastewater into a treated stream with a lower level of suspended solids and a concentrate with a higher level of suspended solids.

Among the advantages of the present invention are automation, efficient use of calcium salts, elimination of chloramine byproducts, and ease of use and filtration. The process can be applied in batch, semi-batch, or continuous-flow modes.

BRIEF DESCRIPTION OF THE DRAWINGS

These and other objects and advantages of the present invention will become more fully apparent upon reading the detailed description of the invention and the appended claims provided below, and upon reference to the drawings, in which:

DETAILED DESCRIPTION OF THE INVENTION

The inventor has discovered a new method for removing fluoride from wastewater containing ammonia that substantially reduces the chemical addition requirements in the calcium fluoride precipitation step and thus substantially reduces costs and solids production. The following detailed description is provided. The current invention provides a cost-effective method for removing fluoride from wastewater containing ammonia.

In general, the present invention provides a method of treating industrial wastewater containing ammonia and fluoride. After standard pretreatment, the ammonia concentration is first reduced by chemical oxidation. Then, a soluble salt, preferably a calcium salt, is added to form a solid fluoride precipitate. Destruction of ammonia in the prior step increases the effectiveness of this precipitation step and thus reduces the chemical addition requirement and cost. Remaining oxidant and oxidation by-products are destroyed by addition of one or more appropriate neutralizing agents. Finally, solids are removed through a filtration or settling process prior to wastewater discharge or reuse.

Figure 1:
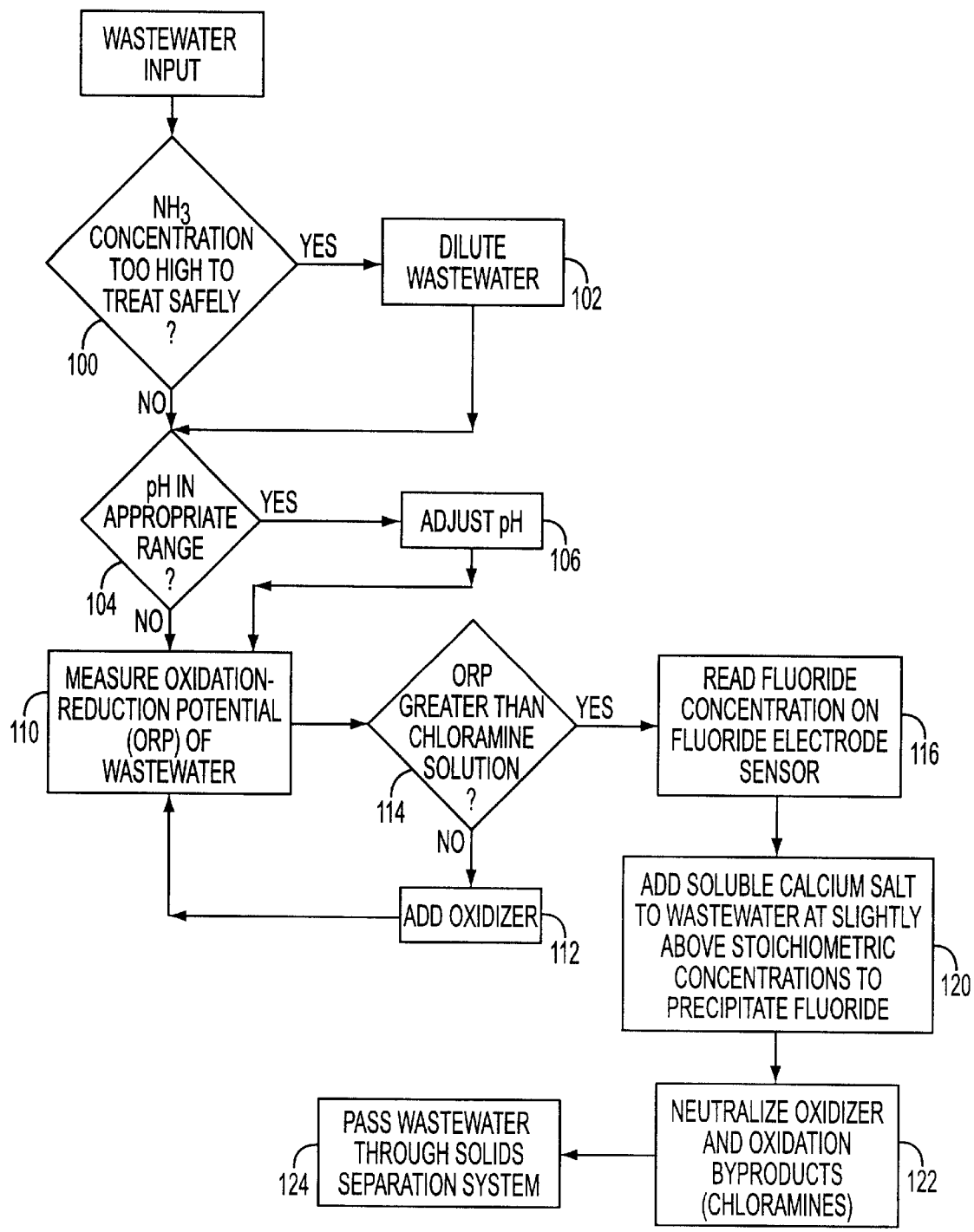
FIG. 1 is a flow chart illustrating the order of treatment steps which may be employed with the method of the present invention.

More specifically, as illustrated by the flow chart in FIG. 1, input wastewater is tested to determine the ammonia concentration 100. If the concentration is too high to be treated safely, the wastewater is diluted 102. For very concentrated ammonia wastes, dilution is necessary to prevent excessive heating or formation of gaseous ammonia fumes during ammonia oxidation. Then, the wastewater is measured 102 and, if necessary, adjusted to the desired pH range by addition of a strong acid or base 106. A pH of approximately 6 to 8 is preferred to minimize formation of toxic by-products with a pH in the range of approximately 7 to 8 being the most preferable. The pH of the wastewater can be adjusted upward using an alkaline compound. Some examples include potassium hydroxide, sodium hydroxide, lime, slaked lime, sodium carbonate, and calcium carbonate. Next, using oxidation reduction potential (ORP) control monitored on an ORP sensor 110, the ammonia is destroyed with sodium hypochlorite, potassium hypochlorite, calcium hypochlorite, chlorine, chlorine dioxide, ozone, and hydrogen peroxide, or another appropriate oxidizer 112. Other methods of measuring the oxidation reduction potential of the wastewater are possible as well. As soon as all the ammonia is destroyed, the ORP signal changes to that of a dilute oxidizer solution rather than that of an ammonia solution 114.

The fluoride concentration can be measured 116 by titration, ion specific electrodes, or other suitable means. Calcium ions are added in the form of, for example, a soluble calcium salt 120. Typical salts include calcium chloride, calcium bromide, lime, slaked lime, and calcium nitrate. Other calcium salts of lesser solubility such as calcium sulfate or calcium carbonate could also be used, especially when used as part of a solid-state fluoride precipitation reaction instead of a straight solution precipitation of fluoride. With the ammonia concentration in the wastewater preferably reduced to less than 20% of the desired effluent concentration of fluoride, complexing of calcium ions by ammonia and ammonium ions is substantially reduced. Calcium ions are preferably added at the rate of approximately 0.55 to 0.65 moles of calcium per mole of fluoride in the influent wastewater.

At this point excess oxidizer is substantially destroyed, along with any chloramines or other oxidation byproducts, using sodium bisulfite, sodium sulfite, sodium thiosulfate, or other appropriate chemical 122. Alternatively, hydrogen peroxide can be used to destroy the hypochlorite or chlorine, then bisulfite and the like can be used to destroy the chloramines. In an another alternative embodiment, the wastewater is passed through an activated or catalytic carbon bed to absorb and adsorb and/or catalytically destroy excess oxidant as well as chloramines and other oxidation byproducts.

After neutralization of oxidation byproducts and excess oxidizer, precipitated calcium fluoride is separated from the wastewater by a solids separation system 124. Preferably, the mixture is treated with a mixture of inorganic and organic coagulants and flocculants in order to give large, non-sticky, easily filterable particles. This coagulating and/or flocculating reagent may preferably be one or more of EnChem™ 0696 coagulant, EnChem™ 9025 polymeric flocculating agent, or any other suitable waste treatment coagulant and flocculant, such as polyaluminum chloride, aluminum chloride, ferric chloride, polyacrylic acids, polyamines, and other suitable organic flocculating agents useful for wastewater floc formation and settling. The resulting suspended particles are filtered using any conventional filtration apparatus, or a settling tank may be used. The most preferred form of the invention uses a combination of EnChem™ 0696 and EnChem™ 9025 coagulants and flocculants, with a MicroBar EnChem™ single pass low pressure bag filtration assembly, followed by pumping of the solids to a filter press, such as that described in U.S. Pat. Nos. 5,904,853 and 5,900,220, the entire disclosures of which are hereby incorporated by reference in their entirety.

In an alternative and equally preferable embodiment of the current invention, the step of neutralizing excess oxidizer and oxidation by-products 122 can be performed after the step of passing the wastewater through a solids separation system 124. This embodiment is preferable if the neutralization step 122 is accomplished using an activated carbon bed. Activated carbon, also sometimes described as catalytic carbon, beds are prone to rapid fouling if used to treat water with an appreciable suspended solids content.

Figure 2:
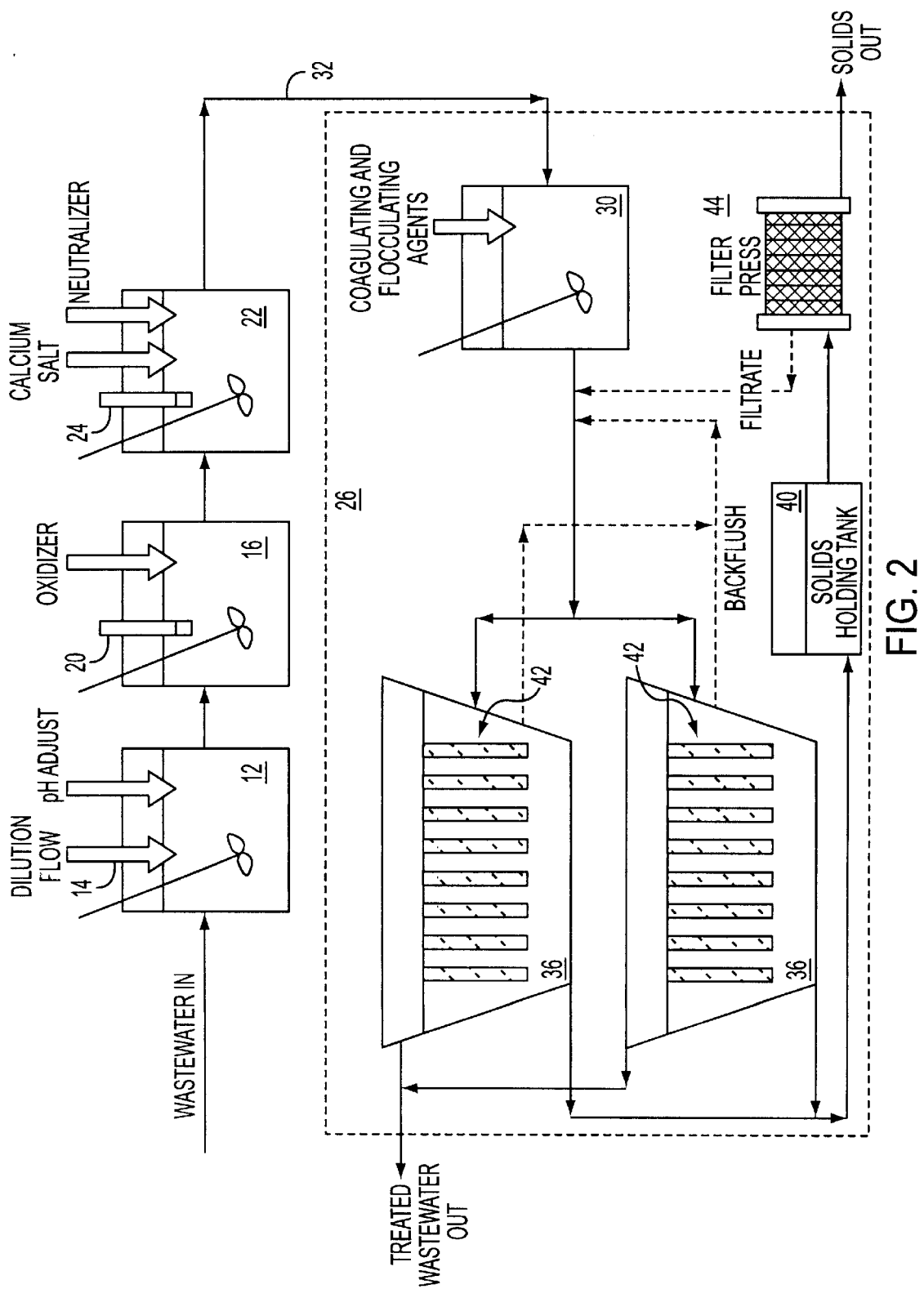
FIG. 2 is a block diagram of one example of a treatment system which may be employed with the method of the present invention.

One example of a suitable wastewater treatment system for carrying out the present invention is illustrated in FIG. 2. FIG. 2 shows a treatment system 10 for wastewater containing ammonia and fluoride.

Wastewater is initially delivered to a dilution tank 12. If the wastewater is known to be high in ammonia concentration, it is diluted with another lower ammonia concentration wastewater stream system 14. In dilution tank 12, The pH of the wastewater in the reaction tank 12 is adjusted to a pH in the range of about 7 to 8 with an appropriate alkaline compound such as for example potassium hydroxide, sodium hydroxide, lime, or slaked lime. The wastewater then flows into a first reaction tank 16 which preferably contains a sensor 20 for measuring the oxidation-reduction potential of the wastewater. Using feedback from the ORP sensor 20, an oxidant is added until the wastewater has an ORP equivalent to that of a dilute hypochlorite solution. Preferred oxidants are chosen from the group of sodium, calcium, or potassium hypochlorite; chlorine, ozone, chlorine dioxide, and hydrogen peroxide. The wastewater in the first reaction tank 16 is stirred to mix the chemicals for a period of time to allow for the reaction to occur. The time will vary depending on the size of the first reaction tank and the initial concentration of the contaminant materials, and will generally be at least about ten minutes. For a continuous flow system, the preferred average retention time in the first reaction tank is preferably in the range of about 10 minutes to 3 hour, with a range of 10 to 30 minutes being most preferred. For batch or semi-batch systems, a minimum treatment time of 10 minutes is preferable with a minimum of 30 minutes reaction time being most preferred.

Once the ammonia oxidation reaction is complete, the wastewater is fed to a second reaction tank 22. The fluoride concentration is determined, preferably using a fluoride sensor 24. A soluble calcium salt, preferably chosen from the group consisting of lime, slaked lime, calcium chloride or bromide, and calcium nitrate is added to the wastewater to precipitate calcium fluoride. The soluble calcium salt is preferably added in a ratio of approximately 0.55 to 0.65 moles of calcium per mole of fluoride in the wastewater. One or more oxidant and oxidation byproduct neutralizing reagents are preferably added to the wastewater in the second reaction tank 22 after addition of the soluble calcium salt. These neutralizing reagents may include a secondary oxidant such as, for example, hydrogen peroxide, followed by a reducing agent such as, for example, sodium bisulfite, sodium sulfite, and sodium thiosulfate. Alternatively a reducing agent may be used alone. Hydrogen peroxide is a secondary oxidizer which rapidly destroys hypochlorite and some chloramines. The reducing agents also destroy the hypochlorite, and any chloramines.

A second ORP sensor (not shown in FIG. 2) can be incorporated in the second reaction tank 22 to estimate the proper dose of neutralizing agents. The desired outcome is destruction of excess oxidant and any chloramines or other oxidation byproducts formed in the first reaction tank 16. The size of the second reaction tank 22 should be such that the residence time of the wastewater solution is about at least three minutes, though longer times are recommended. Due to fluctuating concentrations of actual wastewaters, a residence time of ten to thirty minutes is most preferred.

After precipitation of calcium fluoride and neutralization of oxidation byproducts and excess oxidant in second reaction tank 22, the wastewater flows to a solids separation system 26. This solids separation system preferentially includes a third reaction tank 30 to add one or more organic and inorganic coagulating and flocculating reagents. These organic and inorganic coagulating and flocculating reagents are preferably chosen from the group consisting of EnChem™ 0696 coagulant, EnChem™ 9025 polymer, or other organic flocculating agents useful for wastewater floc formation and settling such as polyaluminum chloride, aluminum chloride, ferric chloride, polyacrylic acids, and polyamines. Alternatively, the precipitating and/or flocculating agents may be added via an in-line mixer (not shown) placed in the delivery line 32 between the second 22 and third 30 reaction tanks. In one exemplary embodiment, a combination of a 30% aluminum based inorganic coagulant solution is added at a concentration of about 1 ml/gal of wastewater and a cationic flocculating agent is added at a concentration of about 10 ppm of active material. Preferably, while adding the precipitating and/or flocculating agents, the pH of the wastewater in the third reaction tank 30 is adjusted upwards to a pH of at least about 7, and preferably to a pH in the range of about 7 to 9. At this pH range, contaminant bearing insoluble particles or compounds are formed in the wastewater. In another embodiment, a polymer or other coagulant agent may be optionally added to the third reaction tank 30 to aid formation of the insoluble compound.

Once formed, the contaminant bearing particles are fed by pump or gravity into a filtration system 34. Any suitable filtration system may be used. FIG. 2 illustrates only one exemplary embodiment of a suitable filtration system. The filtration system 34 in FIG. 2 is comprised generally of a membrane filtration system such as a microfiltration system described in greater detail in U.S. Pat. Nos. 5,871,648 and 5,904,853, the entire disclosures of which are hereby incorporated by reference. In this example, the filtration system generally includes one or more filter or microfiltration tanks 36 and a settling or sludge holding tank 40. A backflush tank (not shown) may be used, and is preferably placed prior to the filter tanks 36. The filter tanks 36 are operated in two modes; namely, a filter tank operating mode and the filter tank backflush mode. The filter tanks 36 generally include a filtration membrane 42 in a tubular "sock" configuration. The membrane sock is placed over a slotted tube to prevent the sock from collapsing during use. The membrane material is commercially available from a variety of sources, and preferably has a pore size in the range of 0.5 to 1 micron, with a pore size of 1 micron being most preferred.

During the operation mode, the contaminant bearing particles are dewatered and filtered from the wastewater. The wastewater is pumped from the filter vessel through the membrane, and as the wastewater passes through the membranes, the particles do not pass through, and instead build up on the outside of the membrane surface. The clean wastewater overflows out of the top of the filter tank for discharge or recycling. The clean wastewater is substantially free of contaminant solids or particles, and will generally contain a concentration of less than 10 ppm total suspended solids.

More specifically, the filter tank is preferably equipped with an array of microfiltration membranes 42 such as that described in the EnChem™ system. Preferably, the microfiltration membranes are comprised of a tubular "sock" configuration to maximize surface area. The membrane sock is placed over a slotted support tube to prevent the sock from collapsing during use. In order to achieve high flow rates and flux values, a number of membranes or membrane modules, each containing a number of individual filter socks, may be used. The microfiltration membranes preferably have a pore size in the range from 0.5 Fm to 10 Fm (microns), and preferably from 0.5 Fm to 1.0 Fm. It has been found that the treated wastewater flow rate through 0.5 to 1 Fm microfiltration membranes can be in the range of approximately 100 GFD to 1500 GFD (gallons per square foot of membrane filtration area per day).

In backflush mode, the wastewater flow is halted and clean water flows through the filtration membranes 42 in the reverse direction to dislodge solids. Dislodged solids are drawn off from the bottom of the microfiltration tanks 36 to the solids holding tank 40. The remaining backflush flow is recycled to the third reaction tank 30 for further treatment in the solids separation system 26. Solids collected in the solids holding tank 40 are periodically fed to a filter press 44 for dewatering. Filtrate from the filter press is recycled to the third reaction tank 30 for removal of solids.

In addition to the EnChem™ trade proprietary coagulants recited above, which work for EnChem™ filtration, other filtration processes, and passive settling processes, any standard wastewater coagulation and flocculation inorganic and organic chemicals may be used in the solids separation step. However, not all combinations will work with EnChem™ filtration. These include ferric alum, aluminum chloride, potassium aluminum sulfate or chloride, polyaluminum chloride, ferric chloride, ferric sulfate, polymeric organic flocculating agents, and other such wastewater treatment coagulation and flocculation chemicals well known in the art. Only EnChem™ proprietary chemicals should be used with the EnChem™ filtration process.

In an alternative embodiment of the present invention, oxidation byproducts and excess oxidant in the wastewater can be neutralized by passing the wastewater through a bed of activated carbon. In this embodiment, the neutralization step is performed after the filtration steps described above. Carbon beds are prone to rapid fouling if used to treat water with an appreciable suspended solids content, so solids must be removed prior to treatment with activated carbon. Catalytic activated carbon is often used to destroy excess hydrogen peroxide, chlorine, hypochlorite, and chloramines. Excess oxidizers react with the high surface area carbon, which is oxidized to carbon dioxide. The activated carbon can also absorb chlorinated organic compounds such as carbon tetrachloride and chloroform, which may be formed from trace amounts of organic compounds when reacted with hypochlorite or other chlorine-containing oxidants.

EXPERIMENTAL

The following experiments are offered for illustrative purposes only, and are not intended to limit the scope of the present invention in any way. The present invention is carried out using a wastewater stream having a total stream of dilute fluoride rinses and buffered oxide etch (BOE) solutions that amount to about 2000 $m^3$/month.

In particular, the BOE solution itself amounts to about 75 $m^3$/month, with a ramp up to about 150 $m^3$/month. Even though the volume is small, the total amount of fluoride and ammonia is large. The BOE waste stream accounts for about 50% of the total fluoride waste from the plant.

In one example, the ammonium fluoride concentration is in the range of 3–8%. There is 0.2–0.6% (all wt %) triammonium phosphate. The silica concentration is in the low few hundred ppm. No substantial amount of organic matter was present. A 20 $m^3$ sample was collected and found to have 5.2% fluoride by weight. Incoming pH was also tested and found to be circa 6, and the amount of 30% caustic that was needed to increase the pH to 7–8. Tests showed the addition of about 5–7% by volume of 30% caustic is added to get the preferred pH range of 7–8 pH.

Given the above criteria, the present invention is carried out with the steps destroying the ammonia with hypochlorite, destroying the residual oxidizer and byproducts with hydrogen peroxide, adding calcium chloride, then adding coagulants and/or flocculants such EnChem™ 0696 and EnChem™ 9025, and then filtering. The whole process can be easily done as a sequential batch process, with none of the complications and few of the uncertainties of a continuous process.

The concentrations of chemicals in this specific example are too high to treat directly. Preferably this solution is diluted to about 25% strength. In one embodiment, the system is comprised of one accumulation tank, and one batch treatment tank, coupled directly to a filtration system, preferably a 20 gpm EnChem™ filter system. This configuration allows the use of one mixer, one set of sensors, and one set of pumps for chemical adds, all in one tank. Specifically the following steps are carried out:

1. Accumulate a day's BOE waste in the accumulation tank of about 1500 gallons. Typical amounts are about 750–1000 gal.
2. Pump this into the 5000 gallon reaction tank. Dilute the waste to about 25% concentration using the clear filter press effluent water from the slaked lime reaction. Note that this is a separate flouride precipitation treatment process which was used in this facility to treat low ammonia content, fluoride bearing wastes. The solids are removed with a filter press, and the resulting clear liquid contains some soluble calcium at pH greater than 9. This was done merely to use an existing compatible wastewater. Any suitable city or process water could be used for dilution instead.
3. The reaction tank needs to be vented to remove ammonia which will be released during processing, and can be accomplished by tying into existing plant scrubber systems for ammonia if available. Neutralize the BOE to about pH 7.5 using 30% caustic.
4. Check the ORP sensor. Add sodium hypochlorite solution until the ORP reading changes and stays steady. Optionally, an ammonia sensor may also be used. The goal for this example is less than 50 ppm residual ammonia.
5. Add 30% hydrogen peroxide to neutralize the residual hypochlorite and chloramines. If the ammonia neutralization reaction is done with sufficient care, there will be little excess of hypochlorite and chloramines, so little hydrogen peroxide will be needed. Preferably the ORP meter is used to monitor the amount added.

6. Read the fluoride amount using an ion sensitive electrode (ISE). The ISE should be a self cleaning model or have filtration to prevent caking and clogging.
7. Add calcium chloride solution in a 0.55 Ca to 1.0 F ratio. Let it stir and react at pH 7–8 for 30 minutes.
8. Read the fluoride ISE again. Repeat step 7 as necessary. The objective is to achieve less than 50 ppm fluoride. With a slow batch treatment system and the ammonia gone, it has been found that this is achieved with only a slightly greater than stoichiometric addition of calcium.
9. Add EnChem™ 0696 and EnChem™ 9025 maintaining the pH at 7–8.
10. Turn on the 20 gpm filtration unit and let it run until the reaction tank is empty. The clear effluent will go to the sewer. The sludge may be sent directly to a suitable filter press. If the total volume of the batch tank is circa 5000 gallons, then the filtration unit will only run for about 4 hours per day. This gives plenty of time to run a batch treatment, and allows for doubling or tripling of their treatment with no change in equipment.

The foregoing description of specific embodiments and examples of the invention have been presented for the purpose of illustration and description, and although the invention has been illustrated by certain of the preceding examples, it is not to be construed as being limited thereby. They are not intended to be exhaustive or to limit the invention to the precise forms disclosed, and obviously many modifications, embodiments, and variations are possible in light of the above teaching. It is intended that the scope of the invention encompass the generic area as herein disclosed, and by the claims appended hereto and their equivalents.

The claimed invention is:

1. A method for treating wastewater containing ammonia and fluoride to remove fluoride and ammonia therefrom, comprising the following steps:
    measuring the oxidation-reduction potential of said wastewater;
    adding an oxidizer to said wastewater in sufficient quantity to increase the oxidation-reduction potential of said wastewater to be more oxidizing than that of a chloramine solution;
    adding a soluble calcium salt to the wastewater at a concentration greater than stoichiometric, said soluble calcium salt lowering the solubility of fluoride in the wastewater and promoting precipitation of solid calcium fluoride;
    destroying excess oxidizer and oxidation by-products in said wastewater;
    separating treated wastewater with a lower level of suspended solids from a concentrate with a higher level of suspended solids.

2. The method according to claim 1 further comprising an initial step of diluting said wastewater to achieve ammonia and fluoride concentrations that can be safely treated without excessive heating and generation of gaseous ammonia fumes.

3. The method according to claim 1 wherein the oxidation reduction potential of said wastewater is measured using an oxidation-reduction potential measuring device.

4. The method according to claim 1 further comprising the step of adjusting the pH of said wastewater prior to and during treatment to pH 6–8 to minimize formation of toxic by-products.

5. The method according to claim 4 wherein the pH of said wastewater is adjusted by addition of a solution containing an alkaline compound selected from the group consisting of potassium hydroxide, sodium hydroxide, lime, slaked lime, sodium carbonate, and calcium carbonate.

6. The method according to claim 4 wherein the pH of said wastewater is initially adjusted to between 7 and 8.

7. The method according to claim 1 wherein said oxidizer is selected from the group consisting of sodium hypochlorite, potassium hypochlorite, calcium hypochlorite, chlorine, chlorine dioxide, ozone, and hydrogen peroxide.

8. The method according to claim 1 wherein said step of destroying excess oxidizer and oxidation by-products in said wastewater is accomplished by adding a secondary oxidizer and an oxidation by-product neutralizing reagent to said wastewater.

9. The method according to claim 8 wherein said secondary oxidizer is hydrogen peroxide.

10. The method according to claim 8 wherein said oxidation by-product neutralizing reagent is selected from the group consisting of sodium bisulfite, sodium sulfite, and sodium thiosulfate.

11. The method according to claim 1 wherein said step of destroying excess oxidizer and oxidation by-products in said wastewater is accomplished by adding a secondary oxidant to said wastewater.

12. The method according to claim 11 wherein said secondary oxidizer is hydrogen peroxide.

13. The method according to claim 1 wherein said step of destroying excess oxidizer and oxidation by-products in said wastewater is accomplished by adding an oxidation by-product neutralizing reagent to said wastewater.

14. The method according to claim 13 wherein said oxidation by-product neutralizing reagent is selected from the group consisting of sodium bisulfite, sodium sulfite, and sodium thiosulfate.

15. The method according to claim 1 wherein said soluble calcium salt is selected from the group consisting of lime, slaked lime, calcium chloride, calcium bromide, calcium nitrate, calcium carbonate, and calcium sulfate.

16. The method according to claim 1 wherein said step of separating treated wastewater further comprises:
    adding one or more coagulating and flocculating reagents to said wastewater; and
    passing said wastewater through a solids separation device.

17. The method according to claim 16 wherein said one or more coagulating and flocculating reagent is selected from the group consisting of EnChem™ 0696 coagulant, EnChem™ 9025 polymer, ferric alum, aluminum chloride, potassium aluminum sulfate, potassium aluminum chloride, polyaluminum chloride, ferric chloride, ferric sulfate, and polymeric organic flocculating agents.

18. The method according to claim 16 wherein said solids separation device is a conventional settling tank.

19. The method according to claim 16 wherein said solids separation device is a filtration membrane system.

20. The method according to claim 16 wherein said solids separation device is an EnChem™ membrane filtration system.

21. The method according to claim 20 wherein said one or more coagulating and flocculating reagents are EnChem™ 0696 coagulant and EnChem™ 9025 polymer.

22. A method for treating wastewater containing ammonia and fluoride to remove fluoride and ammonia therefrom, comprising the following steps:
    measuring the oxidation-reduction potential of said wastewater;
    adding an oxidizer to said wastewater in sufficient quantity to increase the oxidation-reduction potential of said wastewater to be more oxidizing than that of a chloramine solution;

adding a soluble calcium salt to the wastewater at a concentration greater than stoichiometric, said soluble calcium salt lowering the solubility of fluoride in the wastewater and promoting precipitation of solid calcium fluoride;

separating treated wastewater with a lower level of suspended solids from a concentrate with a higher level of suspended solids;

destroying excess oxidizer and oxidation by-products in said wastewater.

23. The method according to claim 22 further comprising an initial step of diluting said wastewater to achieve ammonia and fluoride concentrations that can be safely treated without excessive heating and generation of gaseous ammonia fumes.

24. The method according to claim 22 wherein the oxidation reduction potential of said wastewater is measured using an oxidation-reduction potential measuring device.

25. The method according to claim 22 further comprising the step of adjusting the pH of said wastewater prior to and during treatment to pH 6–8 to minimize formation of toxic by-products.

26. The method according to claim 25 wherein the pH of said wastewater is adjusted by addition of a solution containing an alkaline compound selected from the group consisting of potassium hydroxide, sodium hydroxide, lime, slaked lime, sodium carbonate, and calcium carbonate.

27. The method according to claim 25 wherein the pH of said wastewater is initially adjusted to between 7 and 8.

28. The method according to claim 22 wherein said step of destroying excess oxidizer and oxidation by-products in said wastewater is accomplished by contacting said wastewater with a solid material that absorbs and adsorbs and catalyzes destruction of said excess oxidizer and oxidation by-products.

29. The method of claim 28 wherein said solid material is a bed of activated carbon.

30. The method according to claim 1 wherein said step of destroying excess oxidizer and oxidation by-products in said wastewater is accomplished by adding a secondary oxidizer and an oxidation by-product neutralizing reagent to said wastewater.

31. The method according to claim 30 wherein said secondary oxidizer is hydrogen peroxide.

32. The method according to claim 30 wherein said oxidation by-product neutralizing reagent is selected from the group consisting of sodium bisulfite, sodium sulfite, and sodium thiosulfate.

33. The method according to claim 22 wherein said step of destroying excess oxidizer and oxidation by-products in said wastewater is accomplished by adding a secondary oxidant to said wastewater.

34. The method according to claim 33 wherein said secondary oxidant is hydrogen peroxide.

35. The method according to claim 22 wherein said step of destroying excess oxidizer and oxidation by-products in said wastewater is accomplished by adding an oxidation by-product neutralizing reagent to said wastewater.

36. The method according to claim 35 wherein said oxidation by-product neutralizing reagent is selected from the group consisting of sodium bisulfite, sodium sulfite, and sodium thiosulfate.

37. The method according to claim 22 wherein said soluble calcium salt is selected from the group consisting of lime, slaked lime, calcium chloride, calcium bromide, calcium nitrate, calcium carbonate, and calcium sulfate.

38. The method according to claim 22 wherein said step of separating treated wastewater further comprises:

adding one or more coagulating and flocculating reagents to said wastewater; and passing said wastewater through a solids separation device.

39. The method according to claim 38 wherein said one or more coagulating and flocculating reagent is selected from the group consisting of EnChem™ 0696 coagulant, EnChem™ 9025 polymer, ferric alum, aluminum chloride, potassium aluminum sulfate, potassium aluminum chloride, polyaluminum chloride, ferric chloride, ferric sulfate, and polymeric organic flocculating agents.

40. The method according to claim 38 wherein said solids separation device is a conventional settling tank.

41. The method according to claim 38 wherein said solids separation device is a filtration membrane system.

42. The method according to claim 38 wherein said solids separation device is an EnChem™ membrane filtration system.

43. The method according to claim 42 wherein said one or more coagulating and flocculating reagents are EnChem™ 0696 coagulant and EnChem™ 9025 polymer.

44. A method for treating wastewater containing ammonia and fluoride to remove fluoride and ammonia therefrom, comprising the following steps:

diluting said wastewater to achieve ammonia and fluoride concentrations that can be safely treated without excessive heating and generation of gaseous ammonia fumes;

adjusting the pH of said wastewater prior to and during treatment to pH 7–8 to minimize formation of toxic by-products by addition of a solution containing an alkaline compound selected from the group consisting of potassium hydroxide, sodium hydroxide, lime, slaked lime, sodium carbonate, and calcium carbonate;

measuring the oxidation-reduction potential of said wastewater using an oxidation-reduction potential measuring device;

adding an oxidizer to said wastewater in sufficient quantity to increase the oxidation-reduction potential of said wastewater to be more oxidizing than that of a chloramine solution, said oxidizer being selected from the group consisting of sodium hypochlorite, potassium hypochlorite, calcium hypochlorite, chlorine, chlorine dioxide, ozone, and hydrogen peroxide;

adding a soluble calcium salt to the wastewater at a concentration greater than stoichiometric, said soluble calcium salt lowering the solubility of fluoride in the wastewater and promoting precipitation of solid calcium fluoride, said soluble calcium salt being selected from the group consisting of lime, slaked lime, calcium chloride, calcium bromide, calcium nitrate, calcium carbonate, and calcium sulfate;

destroying excess oxidizer and oxidation by-products in said wastewater by adding one or more oxidation by-product and excess oxidant neutralizing reagents to said wastewater, said one or more oxidation by-product and excess oxidant neutralizing reagents being selected from the group consisting of hydrogen peroxide, sodium bisulfite, sodium sulfite, and sodium thiosulfate;

adding one or more coagulating and flocculating reagents to said wastewater, said one or more coagulating and flocculating reagents being selected from the group consisting of EnChem™ 0696 coagulant, EnChem™ 9025 polymer, ferric alum, aluminum chloride, potassium aluminum sulfate, potassium aluminum chloride, polyaluminum chloride, ferric chloride, ferric sulfate, and polymeric organic flocculating agents; and separating treated wastewater with a lower level of suspended solids from a concentrate with a higher level of suspended solids by passing said wastewater through a solids separation device, said solids separation device being selected from the group consisting of a conventional settling tank, a filtration membrane system, and an EnChem™ membrane filtration system.

45. A method for treating wastewater containing ammonia and fluoride to remove fluoride and ammonia therefrom, comprising the following steps:

diluting said wastewater to achieve ammonia and fluoride concentrations that can be safely treated without excessive heating and generation of gaseous ammonia fumes;

adjusting the pH of said wastewater prior to and during treatment to pH 7–8 to minimize formation of toxic by-products by addition of a solution containing an alkaline compound selected from the group consisting of potassium hydroxide, sodium hydroxide, lime, slaked lime, sodium carbonate, and calcium carbonate;

measuring the oxidation-reduction potential of said wastewater using an oxidation-reduction potential measuring device;

adding an oxidizer to said wastewater in sufficient quantity to increase the oxidation-reduction potential of said wastewater to be more oxidizing than that of a chloramine solution, said oxidizer being selected from the group consisting of sodium hypochlorite, potassium hypochlorite, calcium hypochlorite, chlorine, chlorine dioxide, ozone, and hydrogen peroxide;

adding a soluble calcium salt to the wastewater at a concentration greater than stoichiometric, said soluble calcium salt lowering the solubility of fluoride in the wastewater and promoting precipitation of solid calcium fluoride, said soluble calcium salt being selected from the group consisting of lime, slaked lime, calcium chloride, calcium bromide, calcium nitrate, calcium carbonate, and calcium sulfate;

adding one or more coagulating and flocculating reagents to said wastewater, said one or more coagulating and flocculating reagents being selected from the group consisting of EnChem™ 0696 coagulant, EnChem™ 9025 polymer, ferric alum, aluminum chloride, potassium aluminum sulfate, potassium aluminum chloride, polyaluminum chloride, ferric chloride, ferric sulfate, and polymeric organic flocculating agents;

separating treated wastewater with a lower level of suspended solids from a concentrate with a higher level of suspended solids by passing said wastewater through a solids separation device, said solids separation device being selected from the group consisting of a conventional settling tank, a filtration membrane system, and an EnChem™ membrane filtration system; and destroying excess oxidizer and oxidation by-products in said wastewater by contacting said wastewater with a solid material that absorbs and adsorbs and catalyzes destruction of said excess oxidizer and oxidation by-products.

* * * * *